United States Patent [19]

Bradley et al.

[11] 4,202,910
[45] May 13, 1980

[54] FILTRATION OF VEGETABLE BASED MATTER

[75] Inventors: Timothy G. Bradley, Denver; Raymond L. McAdam, Littleton, both of Colo.

[73] Assignee: Johns-Manville Corporation, Denver, Colo.

[21] Appl. No.: 929,057

[22] Filed: Jul. 28, 1978

Related U.S. Application Data

[62] Division of Ser. No. 766,096, Feb. 7, 1977, Pat. No. 4,134,857.

[51] Int. Cl.² .................... C12H 1/00; A23L 2/30
[52] U.S. Cl. .................................. 426/423; 210/75
[58] Field of Search .............. 426/599, 271, 422, 423, 426/424, 442, 490; 210/59, 75, 192, 193, 500 R, 502; 252/450

[56] References Cited

U.S. PATENT DOCUMENTS

| | | | |
|---|---|---|---|
| 1,929,642 | 10/1932 | Koemann | 426/490 |
| 2,495,751 | 1/1950 | Mills | 252/450 |
| 2,701,240 | 2/1955 | Bregae | 252/450 |
| 2,754,273 | 7/1956 | Shabaker | 252/450 |
| 3,117,004 | 1/1964 | McFarlane | 426/442 |
| 3,406,124 | 10/1968 | Eastwood | 252/450 |
| 3,472,739 | 10/1969 | Ross | 252/450 |
| 3,557,023 | 1/1971 | Raible | 426/424 |
| 3,901,826 | 8/1975 | Hofstadt | 252/450 |
| 3,940,498 | 2/1976 | Butterworth | 426/423 |

FOREIGN PATENT DOCUMENTS 275203 7/1926 United Kingdom ............. 252/450

*Primary Examiner*—Charles N. Hart
*Assistant Examiner*—Ernest G. Therkorn
*Attorney, Agent, or Firm*—R. M. Krone; J. J. Kelly; J. W. McClain

[57] ABSTRACT

A low beverage soluble iron content filter aid, especially diatomite, is disclosed, as is the method for its production, which comprises contacting the granular filter aid with tannic acid, gallic acid, or mixtures thereof, preferable in aqueous solution. Color control agents such as citric acid may also be present in the solution. The treated filter diatomite is useful in the filtration of vegetable based beverages, especially beer, wine, ale and fruit juices. The invention is also applicable to other filter aids which contain beverage soluble iron, such as perlite.

9 Claims, No Drawings

FILTRATION OF VEGETABLE BASED MATTER

This is a division of application Ser. No. 766,096, filed Feb. 7, 1977, now U.S. Pat. No. 4,134,857.

BACKGROUND OF THE INVENTION

The invention herein relates to filter aids, especially diatomite, having a low soluble iron content. It also relates to a method for production of such low soluble iron filter aid.

In the manufacture or processing of a number of vegetable based beverages (notably beer, ale, wine and fruit juices) the beverage is filtered one or more times through granular heterogeneous filter media, usually diatomite. These filter media contain small amounts of various minerals and compounds, among which are iron compounds. A certain small portion of the iron content of the media is soluble in the vegetable beverages. This portion of the iron may be referred to as "beverage soluble iron" (often abbreviated "BSI").

The presence of higher levels of BSI dissolved in the beverage can be deleterious to the taste and long term stability ("shelf life") of the beverage. Consequently, it would be desirable to have a filter medium which is low in BSI content but which retains its desirable filtration and clarification properties.

BRIEF SUMMARY OF THE INVENTION

The invention herein is a method for the production of low beverage soluble iron content filter aid, especially diatomite, which comprises contacting granular filter aid containing a initial content of beverage soluble iron with an aqueous solution of tannic aacid, gallic acid or mixtures thereof to reduce that beverage soluble iron content. Color control agents such as citric acid may also be present in the solution. Also a part of the present invention is a filter aid low in beverage soluble iron content produced in accordance with this method.

DETAILED DESCRIPTION AND PREFERRED EMBODIMENTS

The basic material used in the process of the invention is a granular filter aid which initially contains beverage soluble iron. ("Initially" herein refers to the BSI content immediately prior to the treating process of this invention. The filter aid by that time will probably have already undergone prior processing which may have altered the BSI content of the original material such as crude ore from which the filter aid is made.) For convenience the invention herein will be discussed in terms of diatomite, since this is the common and preferred filter aid for vegetable beverages. However, it will be understood that the process is also applicable to other filter aids, such as perlite and clays, which contain beverage soluble iron. The considerations discussed below for diatomite will be similarly applicable to these other filter aids.

Diatomite is a naturally occuring material found in deposits in various parts of the world. It is formed by the deposition over many years of the siliceous skeletons of ancient microscopic marine organisms known as diatoms. Commercial deposits are found in California, Oregon, Washington and several other states, as well as in several foreign countries. The chemical composition of a typical diatomite is 85 to 90% silica, 2 to 4% alumina, 1 to 2% ferric oxide, and small amounts (less than 1%) of materials such as magnesia, lime, alkalies and titania. There are also typically up to about 5% volatile materials including water, carbon dioxide and organics.

After being mined the diatomite (which is also frequently known as "diatomaceous earth") may be crushed, screened, calcined and classified to separate it into a variety of grades of different granular sizes, purities and reactivites. The grade of diatomite and the various conventional steps of handling and processing are not particularly critical to the present invention. The presence of beverage soluble iron is in part a function of the chemical composition of the original ore. The type of conventional (largely mechanical and thermal) processing techniques used to produce the commercial grades of diatomite may effect the overall amount of BSI in the final diatomite product. However, this invention is generally applicable to all varieties of diatomite containing significant quantities of beverage soluble iron.

In the process of the present invention the beverage soluble iron content of the diatomite is reduced by contacting the granulated diatomite with an aqueous solution of tannic acid, gallic acid or mixtures of these acids. Tannic acid (also known as gallotannic acid and tannin), is a naturally occuring substance found widely in plants, particularly oak and sumac. The exact molecular formula is unknown but is believed to be a mixture of a number of gallic acid derivatives. A typical published formula is $C_{76}H_{52}O_{46}$ with a molecular structure of

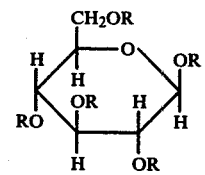

wherein R is galloyl, m-digalloyl, or m-trigalloyl substituents. Typical commercial physical properties of tannic acid are that it decomposes at about 210° C.; may be in the form of powder, flakes or a spongy mass; is odorless; has a strong astringent taste; and is soluble in water, alcohol and acetone and almost insoluble in benzene, chloroform and ether.

Gallic acid (3,4,5-trihydroxybenzoic acid) is commonly in the form of colorless or slightly yellow crystalline needles or prisms which are soluble in alcohol and glycerol and spraringly soluble in water and ether. It has a specific gravity of 1.7 and a melting point of approximately 230° C. It is commonly produced by the action of mold on solutions of tannin or by boiling tannin with strong acid or caustic soda.

In the present invention the diatomite is treated by contacting with aqueous solutions of tannic acid, gallic acid or mixtures of these two. The solution will normally contain 1% to 20% acid by weight although the strength of the acid solution is not critical. The amount of acid (measured as acid rather than solution) useful in the present process will be in the range of from 0.1 to 1.5 gm-moles of acid per ton of diatomite, preferable 0.2 to 1.2 gm-moles of acid per ton of diatomite.

Contacting may be accomplished by any of several means. The acid solution may be sprayed on the diatomite while the latter is being classified by suspension in an air stream. Alternatively the diatomite may be simply washed with the acid, as for instance being put through a bath of the acid solution, or having the acid poured through a layer of the diatomite. Other conventional liquid/solid contacting means such as fluidized beds may also be used. The particular choice of technique to contact the acid and diatomite will often be based on available equipment, economics and similar criteria.

The time of contact will vary according to the strength of the acid solution and the amount of beverage soluble iron present in the diatomite (a typical analysis of diatomite shows 45 to 55 ppm of BSI). The contact time may be very short, such as merely the time it takes to form a slurry of the diatomite in the solution and filter it. The optimum treating time for any specific sample of diatomite and strength of acid can be readily determined by routine experimentation.

If desired the diatomite and/or acid solution may also be heated to a temperature on the order of 90° C. to 100° C. prior to contacting to expedite the reaction by which the acid reduces BSI from the diatomite. The exact nature of this reaction is not known, but it is believed that the BSI is reduced by being complexed with the acid.

Following the acid contacting the diatomite may be washed with water to remove the acid and any extracted iron. If desired a plurality of rinses may be used, the rinse water may be heated, and/or varying lengths of rinse period may be used. However, rinsing is not mandatory, for after being treated with the acid the iron solubility in the beverages is reduced whether it remains on the diatomite or is removed by rinsing. The optimum rinse techniques, if any, will be a simple matter of choice for one skilled in the art.

If desired, the aqueous solution of tannic and/or gallic acid may also contain color control agents. These acids have a tendency to impart dark color to solutions, and the color control agents react with any excess acid to reduce that tendency, thus discolorizing the solutions. Suitable color control agents include citric acid, sodium sulfite, potassium bromate, and ethylene diamine tetraacetric acid. Levels of concentration of these agents will be a matter of routine choice, but typical levels which have been found satisfactory are 0.2 to 0.3 molar in a solution which is 0.04 molar in tannic and/or gallic acid.

The following examples will illustrate the process of this invention. 50 gm samples of a flux calcined California diatomite containing approximately 45 to 55 ppm BSI was pre-heated to approximately 200° F. (93° C.) for three hours. Aqueous solutions of acid were made up using 17% acid in water. Each sample of heated diatomite was put into a blender which was equiped with heating means for maintaining the preheat temperature. Agitation of the diatomite to form an air suspension was obtained by the blender blades. The acid was sprayed into the blender jar. Complete dispersion of the acid through the diatomite was obtained in approximately 2 minutes. The diatomite was then dried and the BSI concentration determined.

In an alternative technique a filter cake was formed on a Buchner filter using 50 gm of diatomite and water. The filter cake was then washed with 500 ml of 17% acid solution. The acid remained in contact with the filter cake for approximately 10 minutes. Thereafter the filter cake was rinsed with water, dried, and BSI concentration determined. Results were found to be equivalent to the spray technique.

Typical results are presented in the table below.

|  | Dosage lb acid/ton diatomite | Reduction of BSI, |
|---|---|---|
| Tannic Acid | 0.9 | 30 |
|  | 1.7 | 50 |
|  | 1.8 | 35 |
|  | 1.9 | 53 |
|  | 3.3 | 70 |
|  | 3.6 | 68 |
| Gallic Acid | 0.43 | 7 |
|  | 0.85 | 35 |
|  | 0.95 | 12 |
|  | 1.9 | 30 |
|  | 2.9 | 40 |

It will be evident from these data that the process of the present invention significantly reduces the amount of beverage soluble iron present in diatomite filtrates. The resultant low beverage soluble iron content diatomite therefore makes a superior filtration medium for vegetable beverages for it substantially reduces the amount of iron which is extracted by the beverage from the diatomite during filtration.

Other contacting fluids were experimented with to determine if there were other materials equivalent to tannic and gallic acids. Water, starch, sucrose, monobasic sodium phosphate, tartaric acid, gluconic acid, salicylic acid, and the sodium salt of ethylene diamine tetraacetic acid were all tried. The organic acids in this group produced only insignificant reduction in BSI. The remaining materials were able to reduce BSI by larger amounts than the organic acids, but took long time periods (often 10 days to 2 weeks) to reach the BSI reduction levels obtained with tannic and gallic acids in a matter of minutes.

What is claimed is:

1. A method of producing a vegetable based beverage which comprises filtering said beverage through a filter aid comprising diatomite or perlite, said filter aid having had its initial content of beverage soluble iron reduced prior to such filtration by contacting the filter aid in granular form with tannic acid, gallic acid or mixtures thereof.

2. A method as in claim 1 wherein the vegetable based beverage is beer.

3. A method as in claim 1 wherein the vegetable based beverage is wine.

4. A method as in claim 1 wherein the vegetable based beverage is ale.

5. A method as in claim 1 wherein the vegetable based beverage is a fruit juice.

6. A method as in claim 1 wherein said filter aid comprises perlite.

7. A method as in claim 1 wherein said filter aid comprises diatomite.

8. A method as in claim 7 wherein the vegetable based beverage is beer, ale, wine or fruit juice.

9. A method as in claim 8 wherein the vegetable based beverage is beer.

* * * * *

UNITED STATES PATENT AND TRADEMARK OFFICE
CERTIFICATE OF CORRECTION

PATENT NO. : 4,202,910
DATED : May 13, 1980
INVENTOR(S) : Timothy G. Bradley
Raymond L. McAdam It is certified that error appears in the above-identified patent and that said Letters Patent are hereby corrected as shown below:

The title "Filtration of Vegetable Based Matter" should read --Filtration of Vegetable Based Beverages--.

Column 4, line 7, after "of BSI," insert --%--.

Signed and Sealed this

Nineteenth Day of August 1980

[SEAL]

Attest:

SIDNEY A. DIAMOND

Attesting Officer

Commissioner of Patents and Trademark